(12) United States Patent
Xu

(10) Patent No.: US 12,106,008 B2
(45) Date of Patent: Oct. 1, 2024

(54) SCREEN SHARING DISPLAY METHOD AND APPARATUS, DEVICE, AND STORAGE MEDIUM

(71) Applicant: Beijing Bytedance Network Technology Co., Ltd., Beijing (CN)

(72) Inventor: Bin Xu, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/258,601

(22) PCT Filed: Dec. 1, 2021

(86) PCT No.: PCT/CN2021/134886
§ 371 (c)(1),
(2) Date: Jun. 21, 2023

(87) PCT Pub. No.: WO2022/135092
PCT Pub. Date: Jun. 30, 2022

(65) Prior Publication Data
US 2024/0045641 A1    Feb. 8, 2024

(30) Foreign Application Priority Data
Dec. 25, 2020   (CN) .......................... 202011563917.4

(51) Int. Cl.
G06F 3/14       (2006.01)
G06F 3/0481     (2022.01)
G06T 9/00       (2006.01)

(52) U.S. Cl.
CPC .......... *G06F 3/1462* (2013.01); *G06F 3/0481* (2013.01); *G06T 9/00* (2013.01)

(58) Field of Classification Search
CPC ..................................................... G06F 3/1462
(Continued)

(56) References Cited

U.S. PATENT DOCUMENTS

2010/0080283 A1   4/2010   Ali et al.
2013/0195198 A1   8/2013   Cheng et al.
(Continued)

FOREIGN PATENT DOCUMENTS

CN    106851282 A    6/2017
CN    106954004 A    7/2017
(Continued)

OTHER PUBLICATIONS

China National Intellectual Property Administration,, International Search Report and Written Opinion Issued in Application No. PCT/CN2021/134886, Feb. 18, 2022, WIPO, 15 pages.
(Continued)

*Primary Examiner* — Long D Pham
(74) *Attorney, Agent, or Firm* — Alleman Hall & Tuttle LLP

(57) ABSTRACT

Embodiments of the present application provide a screen sharing display method and apparatus, a device, and a storage medium. The method is performed by: obtaining two adjacent frames of images of a first terminal device; determining image change information according to the two adjacent frames of images, the image change information indicating a degree of change of a latter frame of image relative to a former frame of image in the two adjacent frames of images; if it is determined that the degree of change indicated by the image change information is greater than or equal to a first preset degree, compressing the latter frame of image to obtain compressed image data; and sending the compressed image data to a second terminal device for display.

17 Claims, 8 Drawing Sheets

(58) Field of Classification Search
USPC .......................................................... 345/163
See application file for complete search history.

(56) References Cited

U.S. PATENT DOCUMENTS

| | | | |
|---|---|---|---|
| 2016/0216932 A1 | 7/2016 | Pettersson et al. | |
| 2016/0350062 A1* | 12/2016 | Katsumata | G09G 5/12 |
| 2017/0264658 A1* | 9/2017 | Shimada | G06F 13/00 |
| 2020/0310739 A1 | 10/2020 | Li et al. | |
| 2021/0127125 A1* | 4/2021 | Fruchter | H04N 19/51 |
| 2021/0193076 A1* | 6/2021 | Morrell | G09G 5/005 |

FOREIGN PATENT DOCUMENTS

| | | |
|---|---|---|
| CN | 108600783 A | 9/2018 |
| CN | 108810610 A | 11/2018 |
| CN | 110559651 A | 12/2019 |
| CN | 111625211 A | 9/2020 |
| CN | 111970518 A | 11/2020 |
| CN | 112714273 A | 4/2021 |
| EP | 3264284 A1 | 1/2018 |

OTHER PUBLICATIONS

China National Intellectual Property Administration, Office Action and Search Report Issued in Application No. 202011563917.4, Jun. 10, 2022, 17 pages.
China National Intellectual Property Administration, Office Action and Search Report Issued in Application No. 202011563917.4, Jan. 12, 2023, 8 pages. Submitted with some English translation.
China National Intellectual Property Administration, Office Action and Search Report Issued in Application No. 202011563917.4, Mar. 23, 2023, 9 pages.
European Patent Office, Supplementary European Search Report Issued in Application No. 21909089.1, Mar. 26, 2024, Germany, 15 pages.
European Patent Office, Extended European Search Report Issued in Application No. 21909089.1, Jul. 22, 2024, 17 pages.

* cited by examiner

SCREEN SHARING DISPLAY METHOD AND APPARATUS, DEVICE, AND STORAGE MEDIUM

CROSS-REFERENCE TO RELATED APPLICATIONS

The present application is a national stage of International Application No. PCT/CN2021/134886, filed on Dec. 1, 2021, which claims priority to Chinese Patent Application No. 202011563917.4, filed on Dec. 25, 2020. Both of the aforementioned applications are hereby incorporated by reference in their entireties.

TECHNICAL FIELD

Embodiments of the present disclosure relate to the technical field of computer and network communication, and in particular, to a screen sharing display method and apparatus, a device, and a storage medium.

BACKGROUND

With the popularization of video conference, users' requirement for remote conference and communication is satisfied, which improves the office efficiency. In a video conference, screen sharing is a very core function. By remotely displaying the screen content to a receiving end for screen sharing, the rapid transmission of information is realized, which effectively improves the information interaction efficiency among users.

At present, in the implementation solution of screen sharing, a sending end for screen sharing needs to collect image data of the screen frame by frame, encodes the image data, and then sends the image data to a user's receiving end through the network for display.

However, since the screen sharing requires high definition of the obtained screen images, huge data traffic is generated in a screen sharing process, which increases the burden of network bandwidth, and causes the problem of video stuttering.

SUMMARY

Embodiments of the present disclosure provide a screen sharing display method and apparatus, a device, and a storage medium, so as to solve the problem of generating huge data traffic, increasing burden of network bandwidth, and causing video stuttering in a screen sharing process.

In a first aspect, an embodiment of the present disclosure provides a screen sharing display method, including: obtaining two adjacent frames of images of a first terminal device; determining image change information according to the two adjacent frames of images, the image change information indicating a degree of change of a latter frame of image relative to a former frame of image in the two adjacent frames of images; if it is determined that the degree of change indicated by the image change information is greater than or equal to a first preset degree, compressing the latter frame of image to obtain compressed image data; and sending the compressed image data to a second terminal device for display.

In a second aspect, an embodiment of the present disclosure provides a screen sharing display method, including: receiving compressed image data sent by a first terminal device; displaying a compressed image frame in the compressed image data.

In a third aspect, an embodiment of the present disclosure provides a screen sharing display apparatus, including:
an obtaining unit, configured to obtain two adjacent frames of images of a first terminal device;
a determining unit, configured to determine image change information according to the two adjacent frames of images, the image change information indicating a degree of change of a latter frame of image relative to a former frame of image in the two adjacent frames of images;
a compressing unit, configured to compress the latter frame of image to obtain compressed image data if it is determined that the degree of change indicated by the image change information is greater than or equal to a first preset degree;
a sending unit, configured to send the compressed image data to a second terminal device for display.

In a fourth aspect, an embodiment of the present disclosure provides a screen sharing display apparatus, including:
a receiving unit, configured to receive compressed image data sent by a first terminal device;
a display unit, configured to display a compressed image frame in the compressed image data.

In a fifth aspect, an embodiment of the present disclosure provides an electrical device, including: at least one processor and a memory;
the memory stores computer-executable instructions;
the at least one processor executes the computer-executable instructions stored in the memory, causing the at least one processor to perform the screen sharing display method according to the first aspect and any possible designs of the first aspect.

In a sixth aspect, an embodiment of the present disclosure provides an electrical device, including: at least one processor and a memory;
the memory stores computer-executable instructions;
the at least one processor executes the computer-executable instructions stored in the memory, causing the at least one processor to perform the screen sharing display method according to the second aspect and any possible designs of the second aspect.

In a seventh aspect, an embodiment of the present disclosure provides a computer-readable storage medium, where the computer-readable storage medium is stored with computer-executable instructions which, when executed by a processor, implement the screen sharing display method according to the first aspect and any possible designs of the first aspect or the screen sharing display method according to the second aspect and any possible designs of the second aspect.

In an eighth aspect, an embodiment of the present disclosure provides a computer program product, including computer program instructions which, when executed by a processor, implement the screen sharing display method according to the first aspect and any possible designs of the first aspect or the screen sharing display method according to the second aspect and any possible designs of the second aspect.

In an ninth aspect, an embodiment of the present disclosure provides a computer program which, when executed by a processor, implements the screen sharing display method according to the first aspect and any possible designs of the first aspect or the screen sharing display method according to the second aspect and any possible designs of the second aspect.

The present embodiments provide a screen sharing display method and apparatus, a device, and a storage medium.

The method is carried out by means of: obtaining two adjacent frames of images of a first terminal device; determining image change information according to the two adjacent frames of images, the image change information indicating a degree of change of a latter frame of image relative to a former frame of image in the two adjacent frames of images; if it is determined that the degree of change indicated by the image change information is greater than or equal to a first preset degree, compressing the latter frame of image to obtain compressed image data; and sending the compressed image data to a second terminal device for display. The image is compressed by the first terminal device according to the degree of change of the image. Thus, if an image changes greatly in a screen sharing process, that is, in a screen sliding process, image data corresponding to the screen image is compressed, which reduces the transmission data volume without affecting the transmission of valid data, solves the problem of huge data traffic in a screen sharing display process, improves the fluency of screen sharing display, and reduces display stuttering.

BRIEF DESCRIPTION OF DRAWINGS

In order to illustrate technical solutions in the embodiments of the present disclosure or in the prior art more clearly, the following will briefly introduce the accompanying drawings needed in the description of the embodiments or the prior art. Obviously, the accompanying drawings in the following description are some embodiments of the present disclosure. For those of ordinary skill in the art, other drawings can also be obtained from these drawings without creative labor.

DESCRIPTION OF EMBODIMENTS

In order to make the objectives, technical solutions, and advantages of the embodiments of the present disclosure clearer, the technical solutions in the embodiments of the present disclosure will be described clearly and comprehensively below with reference to the accompanying drawings in the embodiments of the present disclosure. Apparently, these described embodiments are a part of rather than all embodiments of the present disclosure. Based on the embodiments in the present disclosure, all other embodiments obtained by those of ordinary skill in the art without creative effort shall fall within the protection scope of the present disclosure.

The following first introduces application scenarios involved in the present disclosure.

Figure 1:
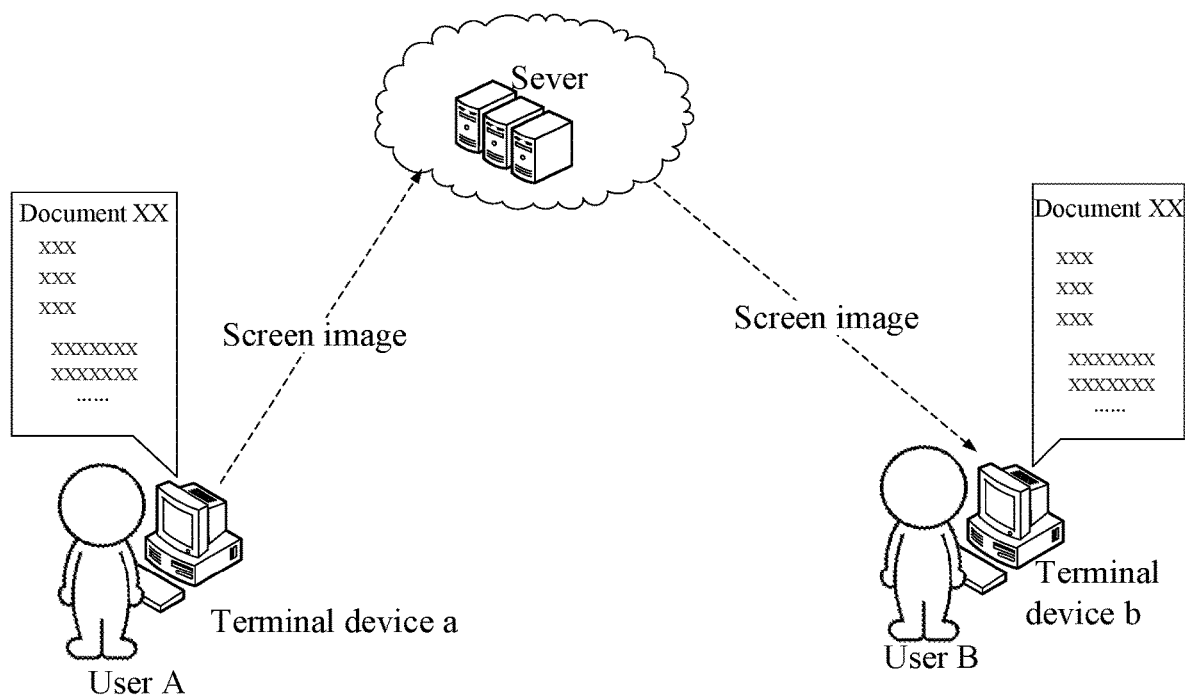
FIG. 1 is a schematic diagram of an application scenario provided by an embodiment of the present disclosure.

FIG. 1 is a schematic diagram of an application scenario provided by an embodiment of the present disclosure. As shown in FIG. 1, in a scenario where the screen sharing function is applied, a user A remotely displays content displayed in a terminal device to a user B. Specifically, after a communication connection is established between a terminal device a operated by the user A and a terminal device b operated by the user B, the user A sends a screen image to the terminal device b operated by the user B through the terminal device a, so that the user B can view online the content on the screen of the terminal device a in real time through the terminal device b. As shown in FIG. 1, data exchange between the terminal device a and the terminal device b can be realized through a cloud server, or the data exchange may be performed directly (not shown in the figure), which is not specifically limited here. In the application scenario shown in FIG. 1, the user A displays the content, which is displayed on the screen of the terminal device a, on the terminal device b through screen sharing, realizing the objectives of real-time document display, information exchange, and the like.

In the prior art, when the screen sharing function is applied, the sending end for screen sharing usually collects image data displayed on the screen frame by frame, encodes the image data, and then sends the image data to a user's receiving end through the network for display. However, since the screen sharing requires high definition of the obtained screen images, collecting and encoding frame by frame will result in huge data traffic during the screen sharing process and increase the burden of network bandwidth. If the network load is too high, it will cause the problem of video stuttering, which affects the effect of screen sharing display.

In practical applications, different from scenarios such as video conference, the main objective of the screen sharing function is to display documents, images and other files with high information density. The display process of such files with high information density usually requires the screen to be kept in a static state for display. Taking the display of a document as an example, when a screen sharing side displays a current page of the document, the screen remains a static state, while a screen viewing side needs to view the content of the current page of the document carefully; after the display of the current page is finished, the document will be slid to a next page for display. Actually, during the sliding period of the document, the user, who is the screen viewing side, does not need to view the content displayed on the screen carefully. Therefore, during the sliding period of the document, performing high-frequency sampling, encoding and transmission of the images displayed on the screen indiscriminately in fact wastes device resources and bandwidth resources, thus causing the problem of network bandwidth burden. Therefore, a method to solve the above problems is urgently needed at this stage.

Embodiments of the present disclosure provide a screen sharing display method to solve the above problems.

Figure 2:
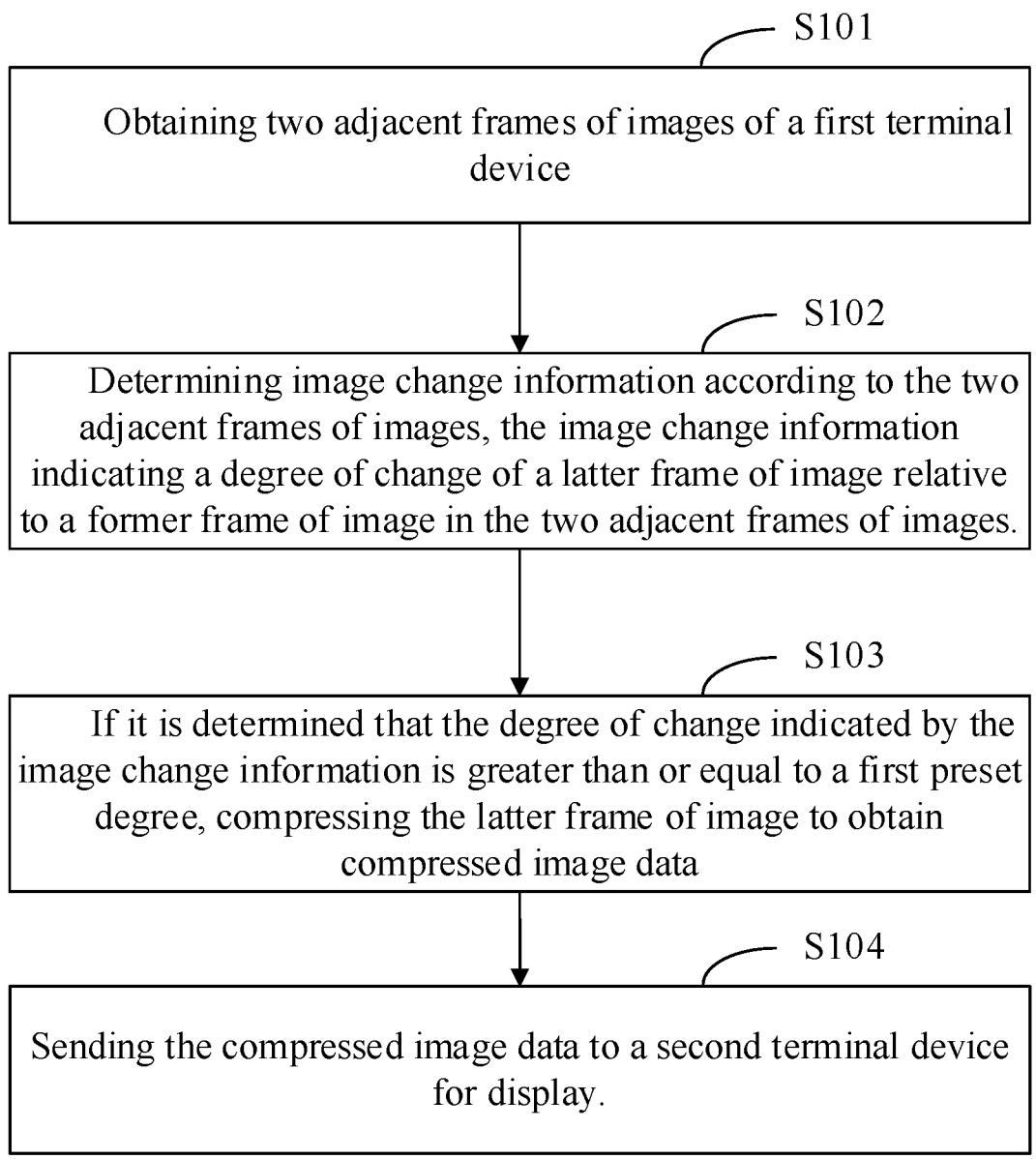
FIG. 2 is a first schematic flowchart of a screen sharing display method provided by an embodiment of the present disclosure.

FIG. 2 is a first schematic flowchart of a screen sharing display method provided by an embodiment of the present disclosure. Referring to FIG. 2, the method of the present embodiment may be applied to a first terminal device, and the screen sharing display method includes:

S101, obtaining two adjacent frames of images of a first terminal device.

Exemplarily, the first terminal device is a terminal device that provides image data for screen sharing, that is, the first terminal device shares local screen images as source information to other terminal devices for viewing. Exemplarily, the method of obtaining images displayed on the screen by the first terminal device may be performing sampling on the content displayed on the screen frame by frame, so as to obtain multiple frames of screen images. Further, in order to determine whether a shared screen is currently in a static state or a sliding state, it is necessary to obtain the changing situation between two adjacent frames of images. For example, the two adjacent frames of images herein may be a latest frame of image currently obtained and a former frame of image adjacent thereto.

S102, determining image change information according to the two adjacent frames of images, the image change information indicating a degree of change of a latter frame of image relative to a former frame of image in the two adjacent frames of images.

Exemplarily, after the two adjacent frames of images are obtained, the change between the two adjacent frames of images is determined, that is, the image change information is determined, and the image change information indicates a degree of change of the latter frame of image relative to the former frame of image in the two adjacent frames of images. Exemplarily, the image change information includes a similarity evaluation value, the similarity evaluation value being used to characterize a similarity between the latter frame of image and the former frame of image in the two adjacent frames.

In a possible implementation, determining the image change information according to two adjacent frames of images includes: determining the similarity of each group of two adjacent frames of images respectively according to multiple groups of two adjacent frames of images, and generating the image change information according to the similarity evaluation value of each group of two adjacent frames of images. Specifically, for example, the similarity corresponding to each group of two adjacent frames of images is calculated respectively to obtain a similarity evaluation value of each group of two adjacent frames of images. Multiple similarity evaluation values corresponding to the multiple groups of two adjacent frames of images form a similarity evaluation value sequence as the image change information.

S103, if it is determined that the degree of change indicated by the image change information is greater than or equal to a first preset degree, compressing the latter frame of image to obtain compressed image data.

Specifically, in a possible implementation, if the degree of change indicated by the image change information is greater than or equal to the first preset degree, it means that the latter frame of image in the two adjacent frames of images has a large change relative to the former frame of image. At this time, it can be determined that the screen is in the sliding state, that is, the information displayed on the screen in such state is meaningless information. In another possible implementation, the image change information is the similarity evaluation value sequence, and the similarity evaluation value sequence includes a plurality of similarity evaluation values. If the degrees of change indicated by the image change information are greater than or equal to the first preset degree, it means that the multiple similarity evaluation values are all less than a preset threshold, that is, there have been multiple consecutive frames of images with great changes. At this time, it can be determined that the screen is in the sliding state, that is, the information displayed on the screen in this state is meaningless information.

When the latter frame of image in the two frames of images has a great change relative to the former frame of image, the latter frame of image will generate a key frame (I frame) in a subsequent encoding process. Data volume of the key frame is larger compared with that of a non-key frame (P frame), and the transmission of the key frame will occupy a larger bandwidth. Therefore, compressing the screen image obtained in this stage can reduce the data volume of the key frame generated in the subsequent encoding, thereby effectively reducing the data transmission volume. Exemplarily, compressing screen data refers to compressing the latter frame of image in the two adjacent frames of images obtained, or the last frame of image in the multiple consecutive frames of images, that is, compressing the latest frame of image currently obtained. Further, compressing the latter frame of image to obtain the compressed image data includes: performing down-sampling on the latter frame of image, for example, down-sampling an image with a resolution of 1080 P to a resolution of 270 P. After the down-sampling, a compressed image frame is obtained, and the compressed image frame has a lower resolution and a smaller image volume than the image before down-sampling.

Further, the compressed image frame is sent to an encoder for encoding processing to obtain compressed image data. Here, the process of encoding the image is the prior art, and details are not repeated here.

S104, sending the compressed image data to a second terminal device for display.

Figure 3:
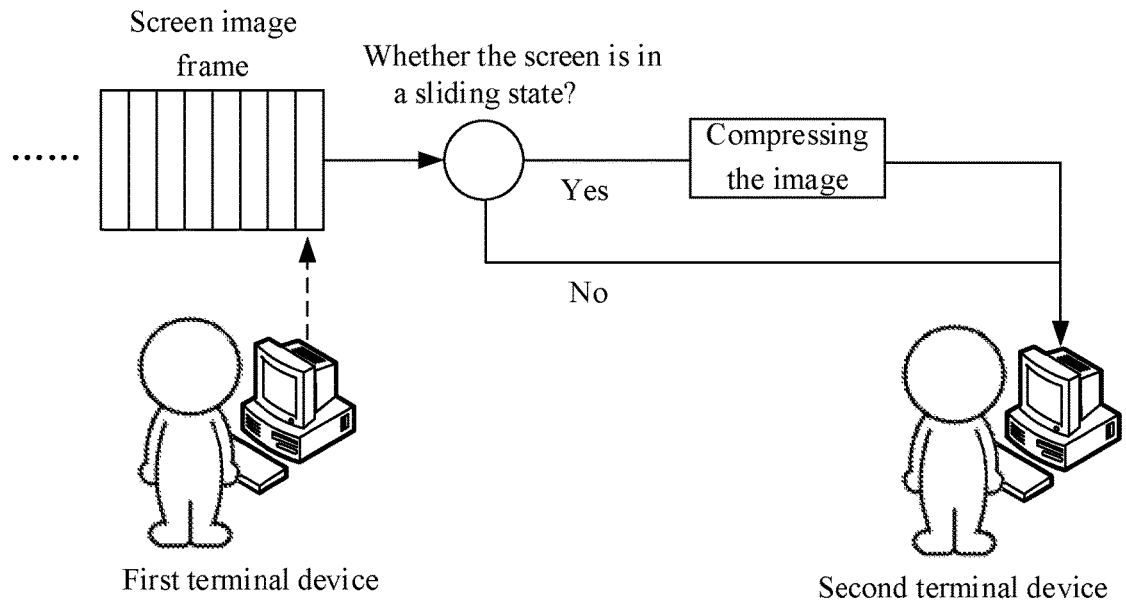
FIG. 3 is a schematic diagram of sending a compressed image to a second terminal device according to an embodiment of the present disclosure.

Exemplarily, the second terminal device is a terminal device that receives and displays the screen sharing image. An implementation of sending the compressed image to the second terminal device may be sending the compressed image data to a cloud server, and the cloud server may forward the compressed image data to the second terminal device; or may be the first terminal device directly sending the compressed image data to the second terminal device, which can be set according to actual needs and is not specifically limited here. After the compressed image data is generated, the compressed image data is sent to the second terminal device, and after the second terminal device decodes the compressed image data, it is displayed, and the process of sharing screen display is completed. FIG. 3 is a schematic diagram of sending a compressed image to a second terminal device according to an embodiment of the present disclosure. As shown in FIG. 3, according to the degree of change between the screen image frame currently obtained and the former frame, it is thus determined by the first terminal device whether the screen is in the sliding state. If it is in the sliding state, the screen image is compressed, and compressed image data is generated and sent to the second terminal device for display, thereby reducing the data transmission volume and network load.

In the present embodiment, by means of obtaining two adjacent frames of images of a first terminal device; determining image change information according to the two adjacent frames of images, the image change information indicating a degree of change of a latter frame of image relative to a former frame of image in the two adjacent frames of images; if it is determined that the degree of change indicated by the image change information is greater than or equal to a first preset degree, compressing the latter frame of image to obtain compressed image data; and sending the compressed image data to a second terminal device for display, the image is compressed by the first terminal device according to the degree of change of the images. Thus, if the images change greatly in a screen sharing process, that is, in a screen sliding process, the image data corresponding to the screen image is compressed, which reduces the transmission data volume without affecting the transmission of valid data, solves the problem of huge data traffic in a screen sharing display process, improves the fluency of screen sharing display, and reduces display stuttering.

Figure 4:
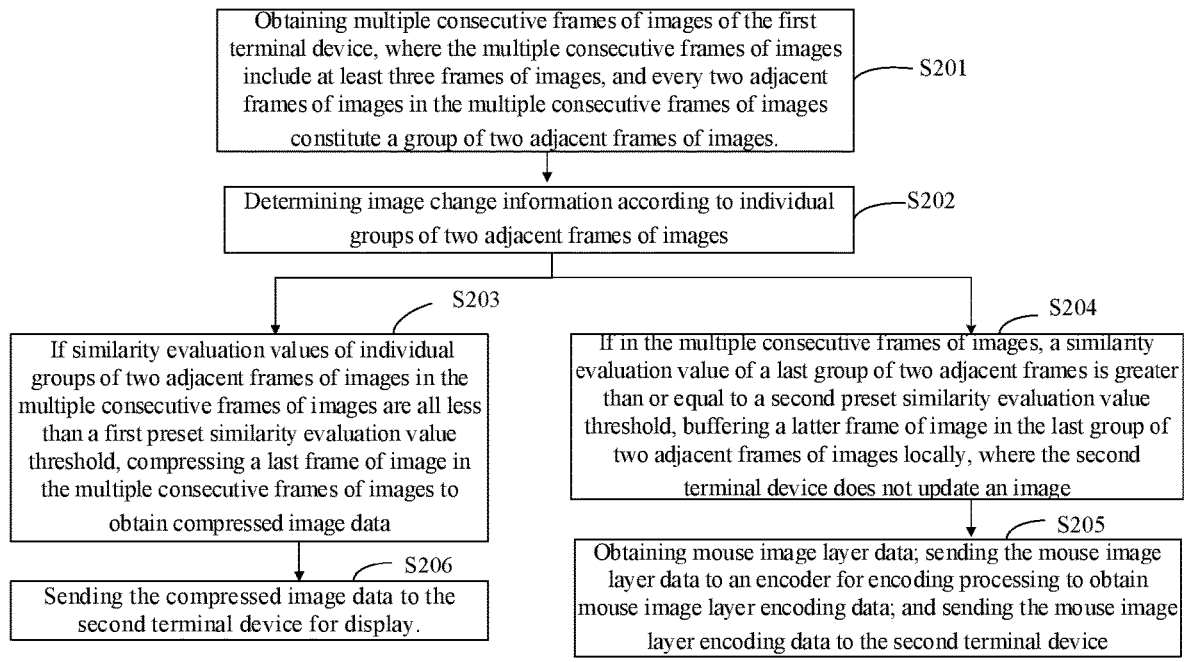
FIG. 4 is a second schematic flowchart of a screen sharing display method provided by an embodiment of the present disclosure.

FIG. 4 is a second schematic flowchart of a screen sharing display method provided by an embodiment of the present disclosure. In the present embodiment, steps S101 to S103 are further specified, and a step of discarding corresponding screen image frame when the screen is in the static state is added. The screen sharing display method includes:

S201, obtaining multiple consecutive frames of images of a first terminal device, where the multiple consecutive frames of images include at least three frames of images, and every two adjacent frames of images in the multiple consecutive frames of images constitute a group of two adjacent frames of images.

Specifically, obtaining the multiple consecutive frames of images of the first terminal device includes: performing frame-by-frame image collection by the first terminal device on the content displayed on its screen; once a frame of image is obtained, buffering the frame of image and storing it in a local storage medium; and then continuing to collect a latter frame of image. The first terminal device, after obtaining a latest current frame of image every time, reads several frames of images adjacent to the current frame of image from the buffer, and combines the several adjacent frames of images with the current frame of image to form the multiple consecutive frames of images. Specifically, for example, two frames of images before the current frame are obtained from the buffer, and together with the current frame of image, three consecutive frames of images are formed.

Figure 5:
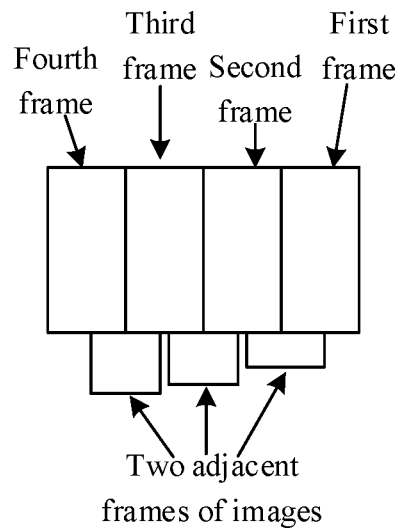
FIG. 5 is a schematic diagram of multiple consecutive frames of images provided by an embodiment of the present disclosure.

Further, each two adjacent frames in the multiple consecutive frames of images constitute a group of two adjacent frames of images. FIG. 5 is a schematic diagram of multiple consecutive frames of images provided by an embodiment of the present disclosure. As shown in FIG. 5, the multiple consecutive frames of images include a first frame to a fourth frame, where the first frame and a second frame, the second frame and a third frame, and the third frame and the fourth frame respectively form three groups of two adjacent frames of images.

S202, determining image change information according to individual groups of two adjacent frames of images.

Exemplarily, the image change information includes a similarity evaluation value sequence, the similarity evaluation value sequence includes a plurality of similarity evaluation values, and each similarity evaluation value corresponds to one group of two adjacent frames of images respectively. The similarity evaluation value is used to characterize the similarity between the latter frame of image and the former frame of image in two adjacent frames of images.

Figure 6:
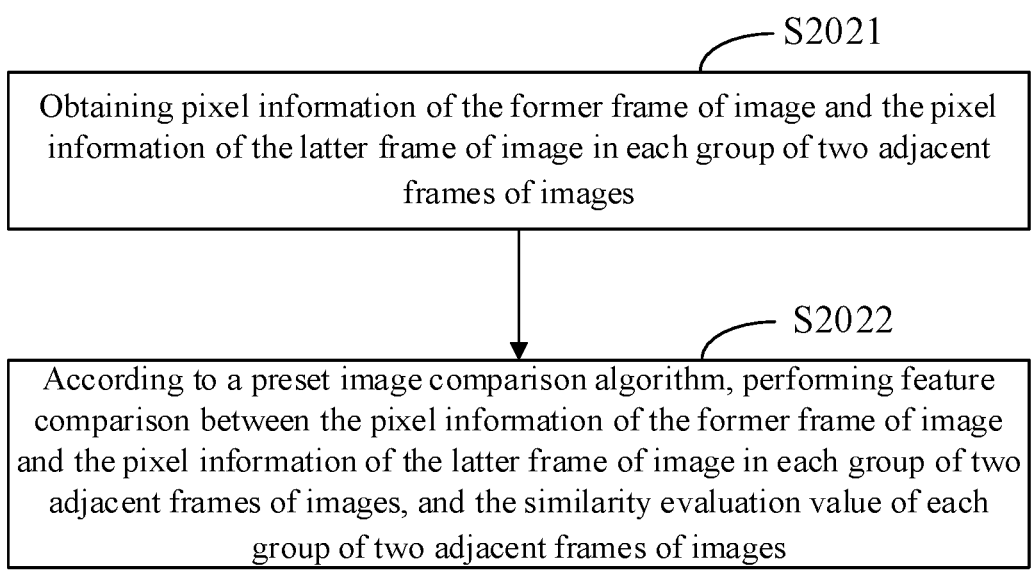
FIG. 6 is a schematic flowchart of step S202 in the embodiment shown in FIG. 4.

In an implementation, as shown in FIG. 6, step S202 includes two specific implementation steps of steps S2021 and S2022.

S2021, obtaining pixel information of the former frame of image and the pixel information of the latter frame of image in each group of two adjacent frames of images.

S2022, according to a preset image comparison algorithm, performing feature comparison between the pixel information of the former frame of image and the pixel information of the latter frame of image in each group of two adjacent frames of images to obtain the similarity evaluation value of each group of two adjacent frames of images.

Exemplarily, the feature comparison is performed on the pixel information of the former frame of image and the pixel information of the latter frame of image in each group of two adjacent frames of images. For example, the similarity between the pixel information of the former frame of image and of the latter frame of image is calculated respectively, thereby obtaining a corresponding similarity evaluation value, where the implementation method of calculating the similarity according to the pixel information is the prior art, which will not be repeated here. For another example, it is also possible to determine the similarity evaluation value of each group of two adjacent frames of images by comparing brightness, contrast, and structure through calculating the structural similarity (SSIM), or by methods such as a content feature method, a key point matching method, etc., which will not be repeated here.

S203, if similarity evaluation values of individual groups of two adjacent frames of images in the multiple consecutive frames of images are all less than a first preset similarity evaluation value threshold, compressing a last frame of image in the multiple consecutive frames of images to obtain compressed image data.

Specifically, if the similarity evaluation values of individual groups of two adjacent frames of images in the multiple consecutive frames of images are all less than the first preset similarity evaluation value threshold, it means that in the multiple consecutive frames of images, there are great changes between individual frames of images. At this time, it is determined that the screen is in the sliding state. When the screen is in the sliding state, the displayed content is the content that the user does not need to view carefully. Moreover, when the screen is in the sliding state, the obtained image will generate the key frame in a subsequent encoding process. The data volume of the key frame is larger compared with that of the non-key frame, and the transmission of the key frame will occupy a larger bandwidth. Therefore, compressing and encoding the plane image obtained in the sliding state, that is, the last frame of image in the multiple consecutive frames of images to obtain compressed image data, and transmitting the compressed image data can effectively reduce the data transmission volume.

S204, if in the multiple consecutive frames of images, a similarity evaluation value of a last group of two adjacent frames is greater than or equal to a second preset similarity evaluation value threshold, buffering a latter frame of image in the last group of two adjacent frames of images locally, where the second terminal device does not update an image.

Specifically, in the process of obtaining screen images by the first terminal device, among the multiple consecutive frames of images obtained, if the similarity evaluation value of the last group of two adjacent frames of images, that is, the latest screen image currently obtained and an adjacent frame of screen image thereof, is greater than or equal to the second preset similarity evaluation value threshold, for example, the similarity evaluation value is greater than 99%, it means that the latest screen image currently obtained has almost no change compared with the adjacent former frame of screen image. At this time, it is determined that the screen is in a static state. When the screen is in the static state, the latest screen image obtained will generate a non-key frame in the subsequent encoding process, and the absence of the non-key frame will not affect the normal play of the video. Therefore, when the screen is in the static state, the content displayed on the screen is not updated. At this time, there is no need to send the obtained screen image to the second terminal device, that is, no non-key frame corresponding to the screen image is generated and sent, which reduces data transmission volume and bandwidth resource consumption, while the second terminal device can continue to display the current screen image without updating the image.

In the present embodiment, the image data is not sent to the second terminal device when it is determined that the similarity evaluation value of the last group of two adjacent frames of images in the multiple consecutive frames of images is greater than or equal to the second preset similarity evaluation value threshold, but only the latest obtained image is buffered for the evaluation of a next frame of screen image, so that when the screen is in the static state, no image data is sent to the second terminal device, which further reduces the data transmission volume in the process of screen sharing display and reduces network load.

Figure 7:
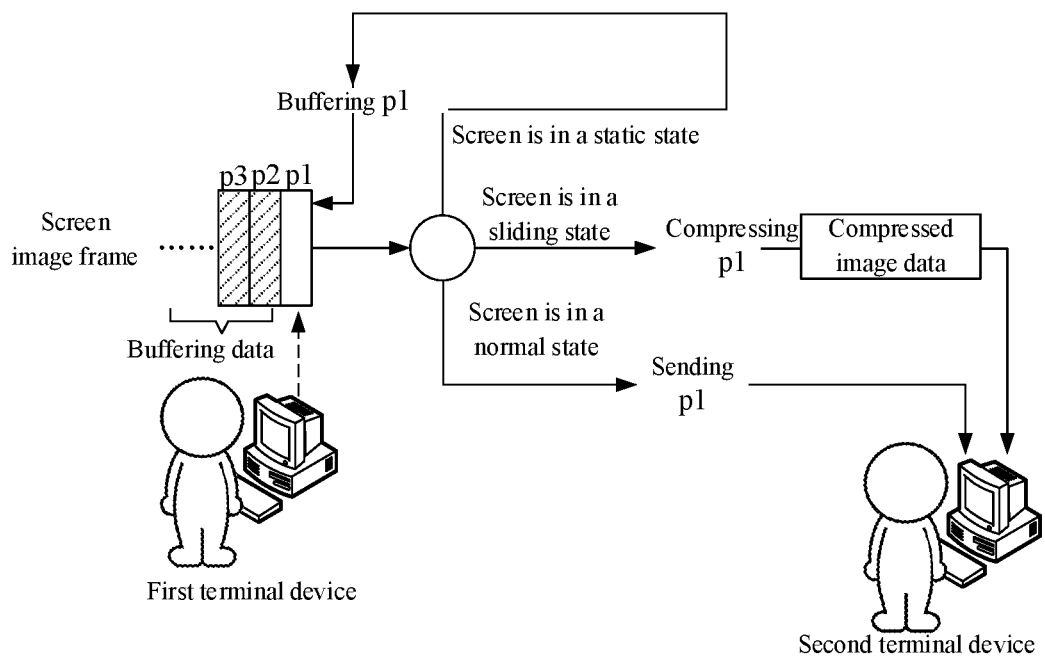
FIG. 7 is a schematic diagram of processing multiple consecutive frames of images provided by an embodiment of the present disclosure.

The process of processing the multiple consecutive frames of images by the first terminal device will be described below with a more specific embodiment. FIG. 7 is a schematic diagram of processing multiple consecutive frames of images according to an embodiment of the present disclosure. As shown in FIG. 7, the first terminal device collects the content displayed on the screen in real time to generate screen image frames and buffers them. The terminal device determines the screen state by evaluating the latest three consecutive frames of images. That is, in the latest three consecutive frames of images, if the similarity evaluation value of two adjacent frames of images composed of a first frame of image p1 and a second frame of image p2 is greater than 99%, it is thus determined that the screen is currently in the static state, and the latest obtained first frame of image p1 is buffered to the local storage medium without sending data to the second terminal device, so that the second terminal device continues to display the current content, without updating the display content, and the first terminal device continues to collect screen images at the same time; if the similarity evaluation value of the two adjacent frames of images composed of the first frame of image p1 and the second frame of image p2 is less than 90%, and the similarity evaluation value of the two adjacent frames of images composed of second frame of image p2 and a third frame of image p3 is also less than 90%, it is thus determined that the screen is currently in the sliding state, and the latest obtained first frame of image p1 is compressed into compressed image data and sent to the second terminal device to enable the second terminal device to update the image; if in other cases, it is thus determined that the current screen is in a normal state, the first terminal device sends the latest obtained first frame of image p1 to the second terminal device for normal display.

In an implementation, if it is determined that the degree of change indicated by the image change information is less than or equal to the second preset degree, a heartbeat signal is sent to the second terminal device, the heartbeat signal being used to indicate that the first terminal device and the second terminal device are in a connection state.

In the steps of the present embodiment, when the degree of change indicated by the image change information is less than or equal to the second preset degree, at this time, the first terminal device does not send data to the second terminal device. In order to enable the second terminal device to confirm in real time its connection state with the first terminal device to avoid a connection reset, the first terminal device sends a heartbeat signal to the second terminal device, so as to improve the connection stability in the screen sharing process.

In an implementation, after step S204, it is further included:

S205, obtaining mouse image layer data; sending the mouse image layer data to an encoder for encoding processing to obtain mouse image layer encoding data; and sending the mouse image layer encoding data to the second terminal device.

Exemplarily, when the first terminal device determines that the screen is in the static state, by not sending screen image data to the second terminal, the objective of reducing the data transmission volume can be achieved. However, in some scenarios, the user of the first terminal device side needs to use a mouse to point to the content displayed on the screen of the first terminal device, so that a voice explanation during the video conference can be more clearly realized. Therefore, a display position of the mouse needs to be sent to the second terminal device for display.

Specifically, after the mouse image layer data is obtained, the mouse image layer data is sent to the encoder for encoding processing, and the mouse image layer encoding data can be obtained. Since the data volume of the mouse image layer data is small, the encoding processing of the mouse image layer data is performed separately, and the generated mouse image layer encoding data is sent to the second terminal device, which has little impact on the data transmission volume. Therefore, the position of the displayed mouse can be updated without updating the screen image, so as to realize the real-time display of the mouse.

S206, sending the compressed image data to the second terminal device for display.

In the present embodiment, step S206 is the same as step S104 in the above-mentioned embodiment. For a detailed description, please refer to the description of step S104, which will not be repeated here.

Figure 8:
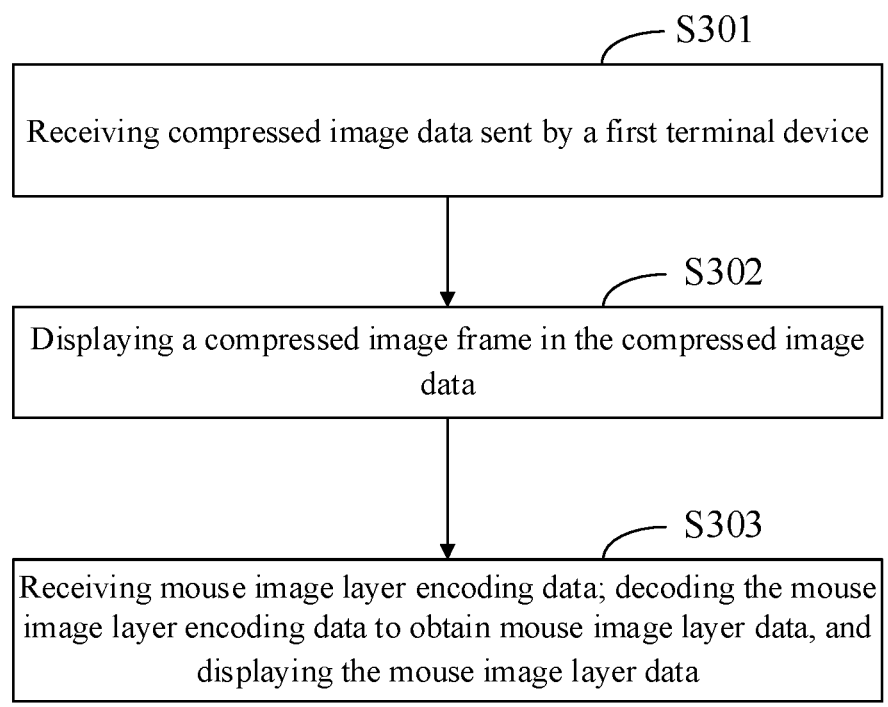
FIG. 8 is a third schematic flowchart of a screen sharing display method provided by an embodiment of the present disclosure.

FIG. 8 is a third schematic flowchart of a screen sharing display method provided by an embodiment of the present disclosure. Referring to FIG. 8, the method of the present embodiment may be applied to a second terminal device, and the screen sharing display method includes:

S301, receiving compressed image data sent by a first terminal device;

S302, displaying a compressed image frame in the compressed image data.

The compressed image data includes a compressed image frame, and the compressed image frame is an image frame obtained by the first terminal device compressing a plane image obtained in the screen sliding state, and the image frame has a smaller volume and a lower resolution. Specifically, displaying the compressed image frame in the compressed image data includes:

decoding the compressed image data to obtain the compressed image frame; and enlarging and displaying the compressed image frame according to a preset image size; where, in the process of compressing the screen image, the first terminal device reduces the size of the image by performing a scale transformation on the image, and in order to display the image in a normal scale on the second terminal device side, the image is then enlarged, that is, the image is subjected to a scale transformation again, so that the image scale matches the screen display scale.

In a possible implementation, the second terminal device continues to display the current frame of image when the second terminal device does not receive the compressed image data sent by the first terminal device.

Further, in a possible implementation, if the heartbeat data sent by the first terminal device is received, and the compressed image data sent by the first terminal device is not received, the current frame of image is displayed; if the heartbeat data sent by the first terminal device is not received and the compressed image data sent by the first terminal device is not received, an alarm message is output.

In an implementation, the method further includes:

S303, receiving mouse image layer encoding data, decoding the mouse image layer encoding data to obtain mouse image layer data, and displaying the mouse image layer data.

After receiving the mouse image layer encoding data, the second terminal device decodes the mouse image layer encoding data to obtain the mouse image layer data, where the mouse image layer data indicates the position of the displayed mouse. According to the mouse image layer encoding data sent in real time by the first terminal device, the mouse is displayed on the second terminal device in real time. The data volume of the mouse image layer encoding data is small, thus, by receiving and processing the mouse image layer encoding data and displaying the mouse, the objective of displaying the mouse without affecting the data transmission volume can be realized.

Figure 9:
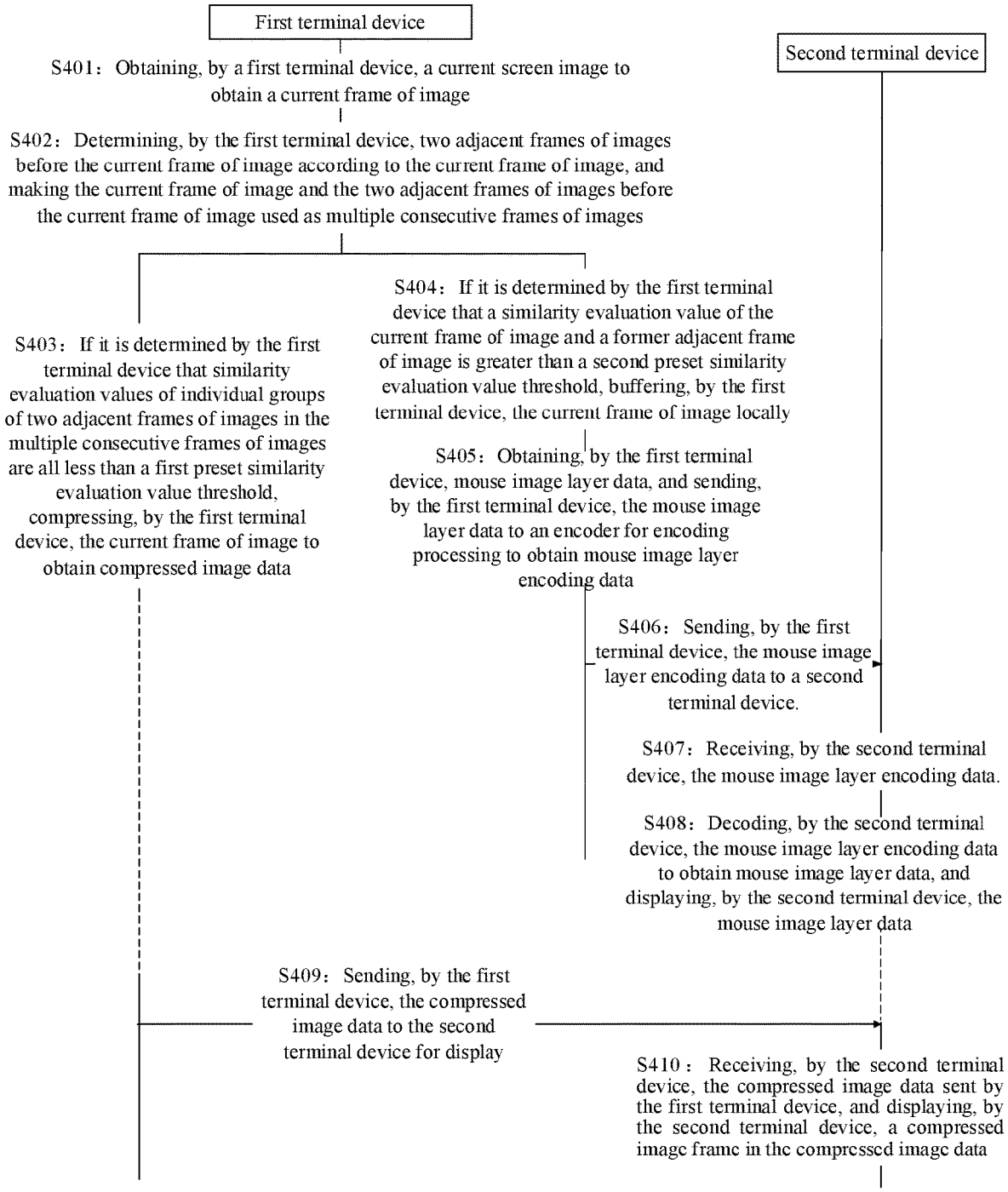
FIG. 9 is a signaling diagram of a screen sharing display method provided by an embodiment of the present disclosure.

FIG. 9 is a signaling diagram of a screen sharing display method provided by an embodiment of the present disclosure. Referring to FIG. 9, the screen sharing display method provided by the embodiment of the present disclosure includes:

S401, obtaining, by a first terminal device, a current screen image to obtain a current frame of image.

S402, determining, by the first terminal device, two adjacent frames of images before the current frame of image according to the current frame of image, and making the current frame of image and the two adjacent frames of images before the current frame of image used as multiple consecutive frames of images.

S403, if it is determined by the first terminal device that similarity evaluation values of individual groups of two adjacent frames of images in the multiple consecutive frames of images are all less than a first preset similarity evaluation value threshold, compressing, by the first terminal device, the current frame of image to obtain compressed image data.

S404, if it is determined by the first terminal device that a similarity evaluation value between the current frame of image and a former adjacent frame of image is greater than or equal to a second preset similarity evaluation value threshold, buffering, by the first terminal device, the current frame of image locally.

S405, obtaining, by the first terminal device, mouse image layer data, and sending, by the first terminal device, the mouse image layer data to an encoder for encoding processing to obtain mouse image layer encoding data.

S406, sending, by the first terminal device, the mouse image layer encoding data to a second terminal device.

S407, receiving, by the second terminal device, the mouse image layer encoding data.

S408, decoding, by the second terminal device, the mouse image layer encoding data to obtain mouse image layer data, and displaying, by the second terminal device, the mouse image layer data.

S409, sending, by the first terminal device, the compressed image data to the second terminal device for display.

S410, receiving, by the second terminal device, the compressed image data sent by the first terminal device, and displaying, by the second terminal device, a compressed image frame in the compressed image data.

The implementation methods and beneficial effects of the steps of S401-S410 in the present embodiment are all described in the embodiments shown in FIGS. 2-7 above, which will not be repeated here.

Figure 10:
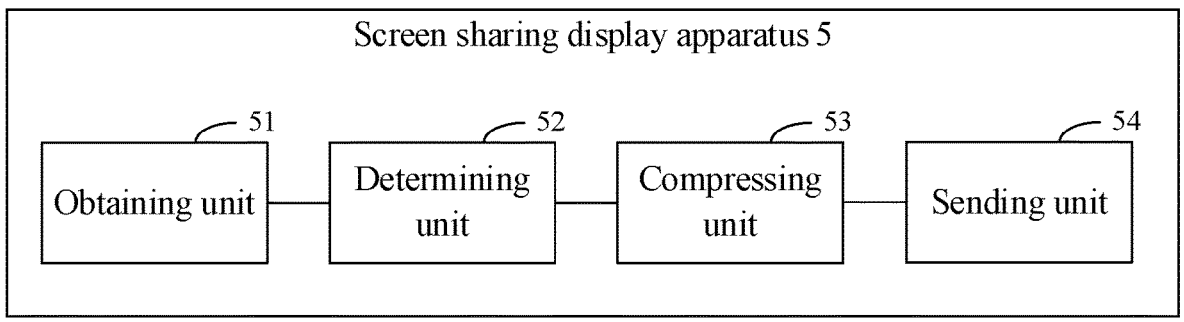
FIG. 10 is a structural block diagram of a screen sharing display apparatus provided by an embodiment of the present disclosure.

Corresponding to the screen sharing display method of the above embodiments, FIG. 10 is a structural block diagram of a screen sharing display apparatus provided by an embodiment of the present disclosure, which is applied to a first terminal device. For convenience of explanation, only the parts related to the embodiments of the present disclosure are shown. Referring to FIG. 10, the screen sharing display apparatus 5 includes:

an obtaining unit 51, configured to obtain two adjacent frames of images of a first terminal device;

a determining unit 52, configured to determine image change information according to the two adjacent frames of images, the image change information indicating a degree of change of a latter frame of image relative to a former frame of image in the two adjacent frames of images;

a compressing unit 53, configured to compress the latter frame of image to obtain compressed image data if it is determined that the degree of change indicated by the image change information is greater than or equal to a first preset degree;

a sending unit 54, configured to send the compressed image data to a second terminal device for display.

In an embodiment of the present disclosure, the determining unit 52 is further configured to: if it is determined that the degree of change indicated by the image change information is less than or equal to a second preset degree, buffer the latter frame of image in the two adjacent frames of images locally, where the second terminal device does not update an image.

In an embodiment of the present disclosure, the obtaining unit 51 is further configured to: obtain multiple consecutive frames of images of the first terminal device, where the multiple consecutive frames of images include at least three consecutive frames of images, and every two adjacent frames in the multiple consecutive frames of images constitute a group of two adjacent frames of images. Correspondingly, the compressing unit 53 is specifically configured to: if degrees of change indicated by the image change information corresponding to individual groups of two adjacent frames of images in the multiple consecutive frames of images are all greater than or equal to the first preset degree, compress a last frame of image in the multiple consecutive frames of images to obtain the compressed image data.

In an embodiment of the present disclosure, the image change information includes a similarity evaluation value, the similarity evaluation value being used to characterize similarity between the latter frame of image and the former frame of image in the two adjacent frames. The compressing unit 53, is specifically configured to: if similarity evaluation values of individual groups of two adjacent frames of images in the multiple consecutive frames of images are all less than a first preset similarity evaluation value threshold, compress the last frame of image in the multiple consecutive frames of images to obtain the compressed image data.

In an embodiment of the present disclosure, the determining unit 52 is further configured to: if in the multiple consecutive frames of images, the similarity evaluation value of a last group of two adjacent frames of images is greater than or equal to a second preset similarity evaluation value threshold, buffer the latter frame of image in the last group of two adjacent frames of images locally, where the second terminal device does not update the image.

In an embodiment of the present disclosure, when the compressing unit 53 compresses the latter frame of image to obtain the compressed image data, the compressing unit 53 is specifically configured to: perform down-sampling on the latter frame of image to obtain a compressed frame of image, and send the compressed frame of image to an encoder for encoding processing to obtain the compressed image data.

In an embodiment of the present disclosure, the sending unit 54 is further configured to: if it is determined that the degree of change indicated by the image change information is less than or equal to the second preset degree, send a heartbeat signal to the second terminal device, the heartbeat signal being used to indicate that the first terminal device and the second terminal device are in a connection state.

In an embodiment of the present disclosure, the obtaining unit 51 is further configured to: obtain mouse image layer data, and send the mouse image layer data to an encoder for encoding processing to obtain mouse image layer encoding data. The sending unit 54 is further configured to send the mouse image layer encoding data to the second terminal device.

In an embodiment of the present disclosure, the determining module 52 is specifically configured to: obtain pixel information of the former frame of image and the pixel information of the latter frame of image, and according to a preset image comparison algorithm, perform feature comparison between the pixel information of the former frame of image and the pixel information of the latter frame of image to determine the image change information.

The device provided in the present embodiment can be used to implement the technical solutions of the foregoing methods of the embodiments, and the implementation principles and technical effects thereof are similar, and details are not described herein again in the present embodiment.

Figure 11:
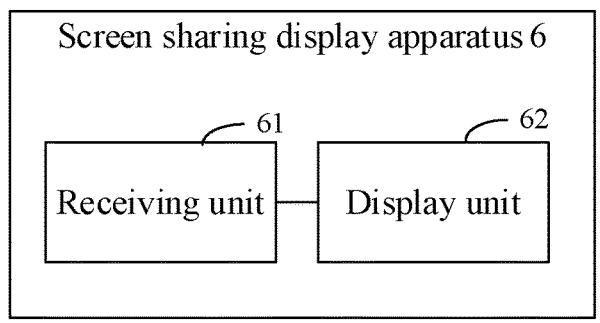
FIG. 11 is a structural block diagram of another screen sharing display apparatus provided by an embodiment of the present disclosure.

FIG. 11 is a structural block diagram of another screen sharing display apparatus provided by an embodiment of the present disclosure, which is applied to a second terminal device. For convenience of explanation, only the parts related to the embodiments of the present disclosure are shown. Referring to FIG. 11, the screen sharing display apparatus 6 includes:
a receiving unit 61, configured to receive compressed image data sent by a first terminal device;
a display unit 62, configured to display a compressed image frame in the compressed image data.

In an embodiment of the present disclosure, the display unit 62 is specifically configured to: decode the compressed image data to obtain a compressed image frame; and enlarge and display the compressed image frame according to a preset image size.

In an embodiment of the present disclosure, the receiving unit 61 is further configured to: receive mouse image layer encoding data. The display unit is further configured to: decode the mouse image layer encoding data to obtain mouse image layer data, and display the mouse image layer data.

In an embodiment of the present disclosure, the display unit 62 is further configured to: continue to display a current frame of image when the display unit 62 does not receive the compressed image data sent by the first terminal device.

In an embodiment of the present disclosure, when the display unit 62 continues to display the current frame of image in the case that the display unit 62 does not receive the compressed data sent by the first terminal device, the display unit 62 is specifically configured to: if the display unit 62 receives heartbeat data sent by the first terminal device and does not receive the compressed image data sent by the first terminal device, display the current image frame; and if the display unit 62 does not receive the heartbeat data sent by the first terminal device and does not receive the compressed image data sent by the first terminal device, output alarm information.

Figure 12:
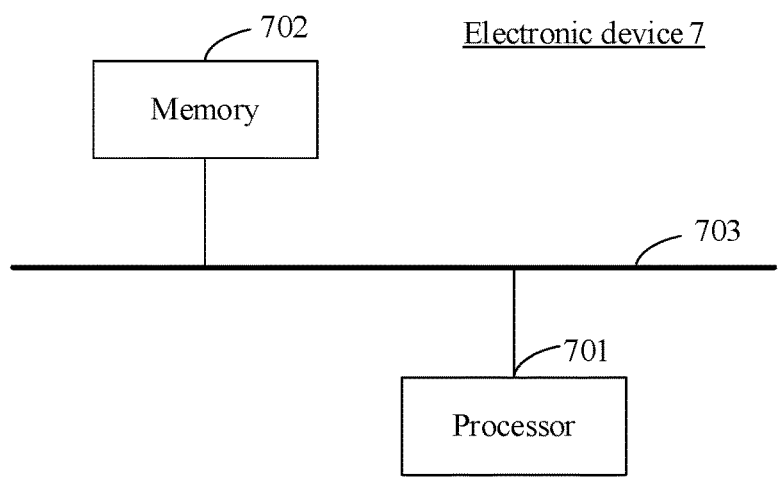
FIG. 12 is a schematic structural diagram of an electronic device provided by an embodiment of the present disclosure.

FIG. 12 is a schematic structural diagram of an electronic device according to an embodiment of the present disclosure. As shown in FIG. 12, the electronic device 7 includes at least one processor 701 and a memory 702;
the memory 702 stores computer-executable instructions;
the at least one processor 701 executes the computer-executed instructions stored in the memory 702, causing the at least one processor 701 to perform the screen sharing method in the embodiments shown in FIGS. 2-7 or the method steps performed by the first terminal device in the embodiment as shown in FIG. 9.

The processor 701 and the memory 702 are connected through a bus 703.

The relevant descriptions can be understood by referring to the relevant descriptions and effects corresponding to the steps in the embodiments corresponding to FIGS. 2-7, and details are not repeated here.

Figure 13:
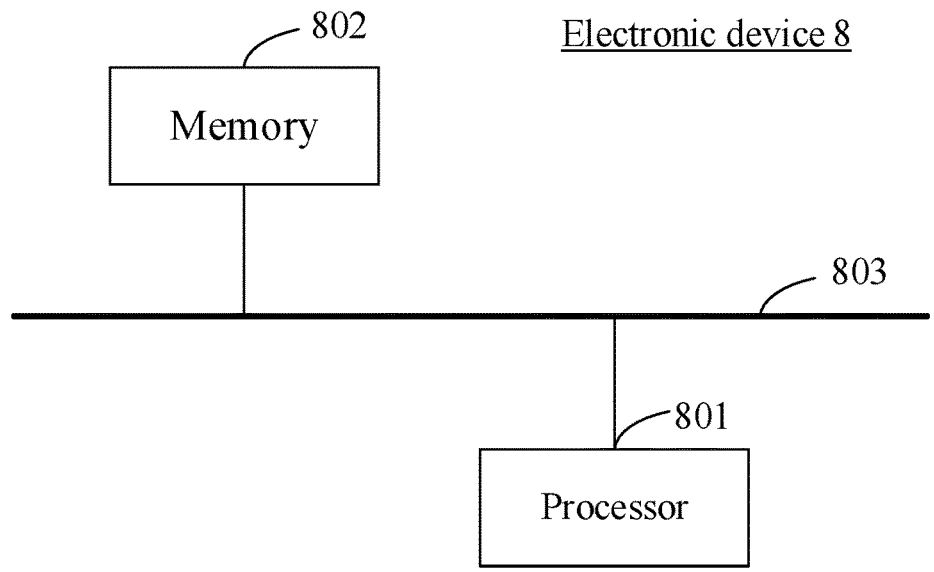
FIG. 13 is a schematic structural diagram of another electronic device provided by an embodiment of the present disclosure.

FIG. 13 is a schematic structural diagram of another electronic device provided by an embodiment of the present disclosure. As shown in FIG. 13, the electronic device 8 includes at least one processor 801 and a memory 802;
the memory 802 stores computer-executable instructions;
the at least one processor 801 executes the computer-executed instructions stored in the memory 802, causing the at least one processor 801 to perform the screen sharing display method in the embodiments shown in FIG. 8, or perform the method steps performed by the second terminal device in the embodiment as shown in FIG. 9.

The processor 801 and the memory 802 are connected through a bus 803.

The relevant descriptions can be understood by referring to the relevant descriptions and effects corresponding to the steps in the embodiment corresponding to FIG. 8, and details are not repeated here.

Figure 14:
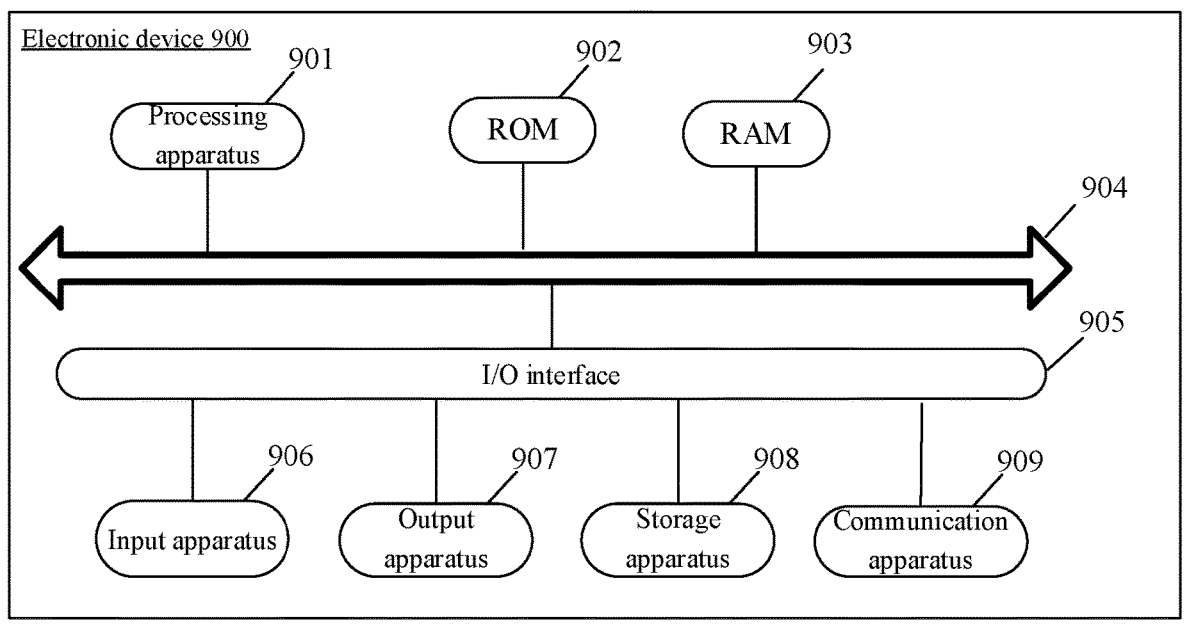
FIG. 14 is a schematic diagram of a hardware structure of an electronic device provided by an embodiment of the present disclosure.

Referring to FIG. 14, it shows a schematic structural diagram of an electronic device 900 suitable for implementing the embodiments of the present disclosure. The electronic device 900 may be a terminal device or a server. The terminal device 900 may include, but is not limited to, a mobile terminal such as a mobile phone, a notebook computer, a digital broadcast receiver, a personal digital assistant (Personal Digital Assistant, PDA), a tablet computer (Portable Android Device, PAD), a portable multimedia player (Portable Media Player, PMP), an in-vehicle terminal (e.g., an in-vehicle navigation terminal), etc., and a stationary terminal such as a digital TV, a desktop computer, etc. The electronic device shown in FIG. 14 is only an example, and should not impose any limitation on the function and scope of use of the embodiments of the present disclosure.

As shown in FIG. 14, the electronic device 900 may include a processing apparatus (such as a central processing unit, a graphics processor, etc.) 901, which may execute various appropriate actions and processes according to a program stored in a read-only memory (Read Only Memory, ROM) 902 or a program loaded from a storage apparatus 908 to a random access memory (Random Access Memory, RAM) 903. In the RAM 903, various programs and data necessary for the operation of the electronic device 900 are also stored. The processing apparatus 901, the ROM 902, and the RAM 903 are connected to each other through a bus 904. An input/output (I/O) interface 905 is also connected to the bus 904.

Generally, the following apparatus can be connected to the I/O interface 905: an input apparatus 906 including, for example, a touch screen, a touch pad, a keyboard, a mouse, a camera, a microphone, an accelerometer, a gyroscope, etc.; an output apparatus 907 including, for example, a liquid crystal display (Liquid Crystal Display, LCD), a speaker, a vibrator, etc.; a storage apparatus 908 including, for example, a magnetic tape, a hard disk, etc.; and a communication apparatus 909. The communication apparatus 909 may allow the electronic device to carry out wireless or wired communication with other devices so as to exchange data. Although FIG. 14 shows an electronic device 900 having various apparatuses, it should be understood that not all of the illustrated apparatuses are required to be implemented or equipped. Alternatively, more or less apparatuses may be implemented or equipped.

In particular, according to embodiments of the present disclosure, the processes described above with reference to the flowcharts may be implemented as a computer software program. For example, an embodiment of the present disclosure includes a computer program product, including a computer program carried on a computer-readable medium, and the computer program includes program codes for executing the methods shown in the flowcharts. In such an embodiment, the computer program may be downloaded from the network via the communication apparatus 909 and installed, or may be installed from the storage apparatus 908, or installed from the ROM 902. When the computer program is executed by the processing apparatus 901, the above-mentioned functions defined in the methods of the embodiments of the present disclosure are executed.

It should be noted that the computer-readable medium mentioned above in the present disclosure may be a computer-readable signal medium or a computer-readable storage medium, or any combination of the above two. The computer readable storage medium can be, for example, but is not limited to, an electrical, magnetic, optical, electromagnetic, infrared, or semiconductive system, apparatus or device, or any combination of the above. More specific examples of the computer readable storage medium may include, but are not limited to, an electrical connection with one or more wires, a portable computer disk, a hard disk, a random access memory (RAM), a read only memory (ROM), an erasable programmable read only memory (Erasable Programmable Read Only Memory, EPROM or flash memory), an optical fiber, a portable compact disc read only memory (Compact Disc-Read Only Memory, CD-ROM), an optical storage device, a magnetic storage device, or any suitable combination of the above. In the present disclosure, a computer-readable storage medium may be any tangible medium that contains or stores a program, the program can be used by or in conjunction with an instruction execution system, apparatus, or device. In the present disclosure, a computer-readable signal medium may include a data signal propagated in a baseband or as part of a carrier wave, and carries computer-readable program codes. Such propagated data signal may be in a variety of forms, including but not limited to an electromagnetic signal, an optical signal, or any suitable combination of the above. The computer-readable signal medium can also be any computer-readable medium other than a computer-readable storage medium and can transmit, propagate, or transport a program for use by or in conjunction with an instruction execution system, apparatus, or device. The program codes included on the computer readable medium may be transmitted using any suitable medium including, but not limited to, an electrical wire, an optical cable, radio frequency (Radio Frequency, RF), etc., or any suitable combination of the above.

The above-mentioned computer-readable medium may be included in the above-mentioned electronic device; it may also exist individually without being assembled into the electronic device.

The above-mentioned computer-readable medium carries one or more programs, and when the above-mentioned one or more programs are executed by the electronic device, the electronic device is caused to execute the methods shown in the above embodiments.

The computer program codes for carrying out operations of the present disclosure may be written in one or more programming languages or combination thereof, and the programming languages include object-oriented programming languages, such as Java, Smalltalk, C++, and conventional procedural programming languages, such as the "C" language or similar programming language. The program codes may be executed entirely on a user's computer, partly on the user's computer, as a stand-alone software package, both partly on the user's computer and partly on a remote computer, or entirely on a remote computer or a server. In the case of the remote computer, the remote computer can be connected to the user's computer through any kind of network, including a Local Area Network (Local Area Network, LAN) or Wide Area Network (Wide Area Network, WAN), or can be connected to an external computer (e.g., using an internet service provider to connect via the internet).

The flowcharts and block diagrams in the accompanying drawings illustrate the architecture, functionality, and operation of possible implementations of systems, methods and computer program products according to various embodiments of the present disclosure. In this regard, each block in the flowcharts or block diagrams may represent part of a module, a program segment, or a code, and the part of the module, the program segment, or the code contains one or more executable instructions for implementing a specified logical function. It should also be noted that, in some alternative implementations, the functions indicated in the blocks may occur in a different order from that shown in the figures. For example, two blocks shown in succession may, in fact, be executed substantially concurrently, or may sometimes be executed in a reverse order, depending upon the function involved. It is also noted that each of blocks in the block diagrams and/or flowchart diagrams, and combinations of the blocks in the block diagrams and/or flowchart diagrams, can be implemented by a dedicated hardware-based system for performing specified functions or operations, or can be implemented by using a combination of dedicated hardware and computer instructions.

The units involved in the embodiments of the present disclosure may be implemented in a software manner, and may also be implemented in a hardware manner. The name of the unit does not constitute a limitation of the unit itself under certain circumstances. For example, a first obtaining unit may also be described as "a unit for obtaining at least two internet protocol addresses".

The functions described herein above may be performed, at least in part, by one or more hardware logic components. For example, without limitation, exemplary types of the hardware logic components that may be used include: field-programmable gate array (Field Programmable Gate Array, FPGA), application specific integrated circuit (Application Specific Integrated Circuit, ASIC), application specific standard products (Application Specific Standard Product, ASSP), system on chip (System on Chip, SOC), complex programmable logical device (Complex Programmable Logic Device, CPLD), etc.

In the context of the present disclosure, a machine-readable medium may be a tangible medium and may contain or store a program for use by or in conjunction with an instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductive system, apparatus, or device, or any suitable combination of the above. More specific examples of the machine-readable storage medium may include an electrical connection based on one or more wires, a portable computer disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device, or any suitable combination of the above.

In a first aspect, according to one or more of embodiments of the present disclosure, a screen sharing display method is provided, including: obtaining two adjacent frames of images of a first terminal device; determining image change information according to the two adjacent frames of images, the image change information indicating a degree of change of a latter frame of image relative to a former frame of image in the two adjacent frames of images; if it is determined that the degree of change indicated by the image change information is greater than or equal to a first preset degree, compressing the latter frame of image to obtain compressed image data; and sending the compressed image data to a second terminal device for display.

According to one or more of embodiments of the present disclosure, the method further includes: if it is determined that the degree of change indicated by the image change information is less than or equal to a second preset degree, buffering the latter frame of image in the two adjacent frames of images locally, without updating an image on the second terminal device.

According to one or more of embodiments of the present disclosure, obtaining the two adjacent frames of images of the first terminal device includes: obtaining multiple consecutive frames of images of the first terminal device, where the multiple consecutive frames of images include at least three consecutive frames of images, and every two adjacent frames of images in the multiple consecutive frames of images constitute a group of two adjacent frames of images; if it is determined that the degree of change indicated by the image change information is greater than or equal to the first preset degree, compressing the latter frame of image to obtain the compressed image data includes: if degrees of change indicated by the image change information corresponding to individual groups of two adjacent frames of images in the multiple consecutive frames of images are all greater than or equal to the first preset degree, compressing a last frame of image in the multiple consecutive frames of images to obtain the compressed image data.

According to one or more of embodiments of the present disclosure, the image change information includes a similarity evaluation value, the similarity evaluation value being used to characterize a similarity between the latter frame of image and the former frame of image in the two adjacent frames of images; if the degrees of change indicated by the image change information corresponding to the individual groups of two adjacent frames of images in the multiple consecutive frames of images are all greater than or equal to the first preset degree, compressing the last frame of image in the multiple consecutive frames of images to obtain the compressed image data includes: if similarity evaluation values of the individual groups of two adjacent frames of images in the multiple consecutive frames of images are all less than or equal to a first preset similarity evaluation value threshold, compressing the last frame of image in the multiple consecutive frames of images to obtain the compressed image data.

According to one or more of embodiments of the present disclosure, the method further includes: if in the multiple consecutive frames of images, the similarity evaluation value of a last group of two adjacent frames of images is greater than or equal to a second preset similarity evaluation value threshold, buffering the latter frame of image in the last group of two adjacent frames of images locally, without updating the image on the second terminal device.

According to one or more of embodiments of the present disclosure, compressing the latter frame of image to obtain the compressed image data includes: performing downsampling on the latter frame of image to obtain a compressed image frame; sending the compressed image to an encoder for encoding processing to obtain the compressed image data.

According to one or more of embodiments of the present disclosure, the method further includes: if it is determined that the degree of change indicated by the image change information is less than or equal to the second preset degree, sending a heartbeat signal to the second terminal device, the heartbeat signal being used to indicate that the first terminal device and the second terminal device are in a connection state.

According to one or more of embodiments of the present disclosure, the method further includes: obtaining mouse image layer data; sending the mouse image layer data to an encoder for encoding processing to obtain mouse image layer encoding data; sending the mouse image layer encoding data to the second terminal device.

According to one or more of embodiments of the present disclosure, determining the image change information according to the two adjacent frames of images includes: obtaining pixel information of the former frame of image and the pixel information of the latter frame of image; according to a preset image comparison algorithm, performing feature comparison between the pixel information of the former frame of image and the pixel information of the latter frame of image to determine the image change information.

In a second aspect, according to one or more of embodiments of the present disclosure, a screen sharing display method is provided, including: receiving compressed image data sent by a first terminal device; displaying a compressed image frame in the compressed image data.

According to one or more of embodiments of the present disclosure, displaying the compressed image frame in the compressed image data includes: decoding the compressed image data to obtain the compressed image frame; enlarging and displaying the compressed image frame according to a preset image size.

According to one or more of embodiments of the present disclosure, the method further includes: receiving mouse image layer encoding data; decoding the mouse image layer encoding data to obtain mouse image layer data, and displaying the mouse image layer data.

According to one or more of embodiments of the present disclosure, the method further includes: when the compressed image data sent by the first terminal device is not received, continuing to display a current frame of image.

According to one or more of embodiments of the present disclosure, when the compressed image data sent by the first terminal device is not received, continuing to display the current frame of image includes: if heartbeat data sent by the first terminal device is received, and the compressed image data sent by the first terminal device is not received, displaying the current frame of image; if the heartbeat data sent by the first terminal device is not received, and the compressed image data sent by the first terminal device is not received, outputting alarm information.

In a third aspect, according to one or more of embodiments of the present disclosure, a screen sharing display apparatus is provided, including:
- an obtaining unit, configured to obtain two adjacent frames of images of a first terminal device;
- a determining unit, configured to determine image change information according to the two adjacent frames of images, the image change information indicating a degree of change of a latter frame of image relative to a former frame of image in the two adjacent frames of images;
- a compressing unit, configured to compress the latter frame of image to obtain compressed image data if it is determined that the degree of change indicated by the image change information is greater than or equal to a first preset degree;
- a sending unit, configured to send the compressed image data to a second terminal device for display.

In an embodiment of the present disclosure, the determining unit is further configured to: if it is determined that the degree of change indicated by the image change information is less than or equal to a second preset degree, buffer the latter frame of image in the two adjacent frames of images locally, where the second terminal device does not update an image.

According to one or more of embodiments of the present disclosure, the obtaining unit is further configured to: obtain multiple consecutive frames of images of the first terminal device, where the multiple consecutive frames of images include at least three consecutive frames of images, and every two adjacent frames of images in the multiple consecutive frames of images constitute a group of two adjacent frames of images; correspondingly, the compressing unit is specifically configured to: if degrees of change indicated by the image change information corresponding to individual groups of two adjacent frames of images in the multiple consecutive frames of images are all greater than or equal to the first preset degree, compress a last frame of image in the multiple consecutive frames of images to obtain the compressed image data.

According to one or more of embodiments of the present disclosure, the image change information includes a similarity evaluation value, the similarity evaluation value being used to characterize a similarity between the latter frame of image and the former frame of image in the two adjacent frames; the compressing unit is specifically configured to: if similarity evaluation values of the individual groups of two adjacent frames of images in the multiple consecutive frames of images are all less than or equal to a first preset similarity evaluation value threshold, compress the last frame of image in the multiple consecutive frames of images to obtain the compressed image data.

According to one or more of embodiments of the present disclosure, the determining unit is further configured to: if in the multiple consecutive frames of images, the similarity evaluation value of a last group of two adjacent frames of images is greater than or equal to a second preset similarity evaluation value threshold, buffer the latter frame of image in the last group of two adjacent frames of images locally, where the second terminal device does not update the image.

According to one or more of embodiments of the present disclosure, when the compressing unit compresses the latter frame of image to obtain the compressed image data, the compressing unit is specifically configured to: perform down-sampling on the latter frame of image to obtain a compressed image frame; and send the compressed image frame to an encoder for encoding processing to obtain the compressed image data.

According to one or more of embodiments of the present disclosure, the sending unit is further configured to: if it is determined that the degree of change indicated by the image change information is less than or equal to the second preset degree, send a heartbeat signal to the second terminal device, the heartbeat signal being used to indicate that the first terminal device and the second terminal device are in a connection state.

According to one or more of embodiments of the present disclosure, the obtaining unit is further configured to: obtain mouse image layer data; and send the mouse image layer data to an encoder for encoding processing to obtain mouse image layer encoding data. The sending unit is further configured to send the mouse image layer encoding data to the second terminal device.

According to one or more of embodiments of the present disclosure, the determining module is specifically configured to: obtain pixel information of the former frame of image and the pixel information of the latter frame of image; according to a preset image comparison algorithm, perform feature comparison between the pixel information of the former frame of image and the pixel information of the latter frame of image to determine the image change information.

In a fourth aspect, according to one or more of embodiments of the present disclosure, a screen sharing display apparatus is provided, including:
- a receiving unit, configured to receive compressed image data sent by a first terminal device;
- a display unit, configured to display a compressed image frame in the compressed image data.

According to one or more of embodiments of the present disclosure, the display unit is specifically configured to: decode the compressed image data to obtain the compressed image frame; and enlarge and display the compressed image frame according to a preset image size.

According to one or more embodiments of the present disclosure, the receiving unit is further configured to: receive mouse image layer encoding data. The display unit is further configured to: decode the mouse image layer encoding data to obtain mouse image layer data, and display the mouse image layer data.

According to one or more embodiments of the present disclosure, the display unit is further configured to: continue to display a current frame of image when the compressed image data sent by the first terminal device is not received.

According to one or more of embodiments of the present disclosure, when the display unit continues to display the current frame of image in the case that the display unit does not receive the compressed data sent by the first terminal device, the display unit is specifically configured to: if heartbeat data sent by the first terminal device is received, and the compressed image data sent by the first terminal device is not received, display the current frame of image; if the heartbeat data sent by the first terminal device is not received, and the compressed image data sent by the first terminal device is not received, output alarm information.

In a fifth aspect, according to one or more of embodiments of the present disclosure, an electrical device is provided, including: at least one processor and a memory;
the memory stores computer-executable instructions;
the at least one processor executes the computer-executable instructions stored in the memory, causing the at least one processor to perform the screen sharing display method according to the first aspect and any possible designs of the first aspect.

In a sixth aspect, according to one or more of embodiments of the present disclosure, an electrical device is provided, including: at least one processor and a memory;
the memory stores computer-executable instructions;
the at least one processor executes the computer-executable instructions stored in the memory, causing the at least one processor to perform the screen sharing display method according to the second aspect and any possible designs of the second aspect.

In a seventh aspect, according to one or more of embodiments of the present disclosure, a computer-readable storage medium is provided, where the computer-readable storage medium is stored with computer-executable instructions which, when executed by a processor, implement the screen sharing display method according to the first aspect and any possible designs of the first aspect or the screen sharing display method according to the second aspect and any possible designs of the second aspect.

In an eighth aspect, according to one or more of embodiments of the present disclosure, a computer program product is provided, including computer program instructions which, when executed by a processor, implement the screen sharing display method according to the first aspect and any possible designs of the first aspect or the screen sharing display method according to the second aspect and any possible designs of the second aspect.

In an ninth aspect, according to one or more of embodiments of the present disclosure, a computer program is provided, which, when executed by a processor, implements the screen sharing display method according to the first aspect and any possible designs of the first aspect or the screen sharing display method according to the second aspect and any possible designs of the second aspect.

The above descriptions are merely the illustration of preferred embodiments of the present disclosure and the technical principles employed thereto. Those skilled in the art should understand that the scope of disclosure involved in the present disclosure is not limited to the technical solutions formed by specific combinations of the above-mentioned technical features, and should cover, without departing from the above-mentioned disclosed concept, other technical solutions formed by any combination of the above-mentioned technical features or equivalent features thereof, for example, technical solutions formed by replacing the above features with the technical features having similar functions disclosed in the present disclosure (but not limited to those).

Additionally, although operations are depicted in a particular order, this should not be construed as requiring that the operations are performed in the particular order shown or in a sequential order. Under certain circumstances, multitasking and parallel processing may be advantageous. Likewise, although the above description contains several specific implementation details, which should not be construed as limitations on the scope of the present disclosure. Certain features described in the context of separate embodiments can also be implemented in combination in a single embodiment. Conversely, various features described in the context of a single embodiment can also be implemented in multiple embodiments separately or in any suitable subcombination.

Although the subject matters have been described by a language specific to structural features and/or method logical actions, it should be understood that the subject matters defined in the appended claims is not necessarily limited to specific features or actions described above. Rather, the specific features and actions described above are merely examples for implementing the claims.

What is claimed is:

1. A screen sharing display method, comprising:
obtaining two adjacent frames of images of a first terminal device;
determining image change information according to the two adjacent frames of images, the image change information indicating a degree of change of a latter frame of image relative to a former frame of image in the two adjacent frames of images;
if it is determined that the degree of change indicated by the image change information is greater than or equal to a first preset degree, compressing the latter frame of image to obtain compressed image data;
sending the compressed image data to a second terminal device for display; and
if it is determined that the degree of change indicated by the image change information is less than or equal to a second preset degree, buffering the latter frame of image in the two adjacent frames of images locally, without updating an image on the second terminal device.

2. The method according to claim 1, wherein obtaining the two adjacent frames of images of the first terminal device comprises:
obtaining multiple consecutive frames of images of the first terminal device, wherein the multiple consecutive frames of images comprise at least three consecutive frames of images, and every two adjacent frames of images in the multiple consecutive frames of images constitute a group of two adjacent frames of images;
if it is determined that the degree of change indicated by the image change information is greater than or equal to the first preset degree, compressing the latter frame of image to obtain the compressed image data comprises:

if degrees of change indicated by the image change information corresponding to individual groups of two adjacent frames of images in the multiple consecutive frames of images are all greater than or equal to the first preset degree, compressing a last frame of image in the multiple consecutive frames of images to obtain the compressed image data.

3. The method according to claim 2, wherein the image change information comprises a similarity evaluation value, the similarity evaluation value being used to characterize a similarity between the latter frame of image and the former frame of image in the two adjacent frames of images; if the degrees of change indicated by the image change information corresponding to the individual groups of two adjacent frames of images in the multiple consecutive frames of images are all greater than or equal to the first preset degree, compressing the last frame of image in the multiple consecutive frames of images to obtain the compressed image data comprises:

if similarity evaluation values of the individual groups of two adjacent frames of images in the multiple consecutive frames of images are all less than or equal to a first preset similarity evaluation value threshold, compressing the last frame of image in the multiple consecutive frames of images to obtain the compressed image data.

4. The method according to claim 3, wherein the method further comprises:

if in the multiple consecutive frames of images, the similarity evaluation value of a last group of two adjacent frames of images is greater than or equal to a second preset similarity evaluation value threshold, buffering the latter frame of image in the last group of two adjacent frames of images locally, without updating an image on the second terminal device.

5. The method according to claim 1, wherein compressing the latter frame of image to obtain the compressed image data comprises:

performing down-sampling on the latter frame of image to obtain a compressed image frame;
sending the compressed image frame to an encoder for encoding processing to obtain the compressed image data.

6. The method according to claim 1, wherein the method further comprises:

if it is determined that the degree of change indicated by the image change information is less than or equal to the second preset degree, sending a heartbeat signal to the second terminal device, the heartbeat signal being used to indicate that the first terminal device and the second terminal device are in a connection state.

7. The method according to claim 1, wherein the method further comprises:

obtaining mouse image layer data;
sending the mouse image layer data to an encoder for encoding processing to obtain mouse image layer encoding data;
sending the mouse image layer encoding data to the second terminal device.

8. The method according to claim 1, wherein determining the image change information according to the two adjacent frames of images comprises:

obtaining pixel information of the former frame of image and the pixel information of the latter frame of image;
according to a preset image comparison algorithm, performing feature comparison between the pixel information of the former frame of image and the pixel information of the latter frame of image to determine the image change information.

9. A screen sharing display apparatus, comprising:
at least one processor and a memory;
the memory stores computer-executable instructions;
the at least one processor executes the computer-executable instructions stored in the memory, causing the at least one processor to perform the screen sharing display method according to claim 1.

10. An electronic device, comprising at least one processor and a memory;
the memory stores computer-executable instructions;
the at least one processor executes the computer-executable instructions stored in the memory, causing the at least one processor to perform the screen sharing method according to claim 1.

11. A non-transitory computer-readable storage medium, wherein the non-transitory computer-readable storage medium is stored with computer-executable instructions which, when executed by a processor, implement the screen sharing display method according to claim 1.

12. A screen sharing display method, comprising:
receiving compressed image data sent by a first terminal device;
displaying a compressed image frame in the compressed image data;
if heartbeat data sent by the first terminal device is received, and the compressed image data sent by the first terminal device is not received, displaying a current frame of image; and
if the heartbeat data sent by the first terminal device is not received, and the compressed image data sent by the first terminal device is not received, outputting alarm information.

13. The method according to claim 12, wherein displaying the compressed image frame in the compressed image data comprises:
decoding the compressed image data to obtain the compressed image frame;
enlarging and displaying the compressed image frame according to a preset image size.

14. The method according to claim 12, wherein the method further comprises:
receiving mouse image layer encoding data;
decoding the mouse image layer encoding data to obtain mouse image layer data, and displaying the mouse image layer data.

15. A screen sharing display apparatus, comprising:
at least one processor and a memory;
the memory stores computer-executable instructions;
the at least one processor executes the computer-executable instructions stored in the memory, causing the at least one processor to perform the screen sharing display method according to claim 12.

16. An electronic device, comprising at least one processor and a memory;
the memory stores computer-executable instructions;
the at least one processor executes the computer-executable instructions stored in the memory, causing the at least one processor to perform the screen sharing display method according to claim 12.

17. A non-transitory computer-readable storage medium, wherein the computer-readable storage medium is stored with computer-executable instructions which, when executed by a processor, implement the screen sharing display method according to claim 12.

\* \* \* \* \*